(12) United States Patent
Xia

(10) Patent No.: US 11,646,976 B2
(45) Date of Patent: May 9, 2023

(54) ESTABLISHMENT OF FAST FORWARDING TABLE

(71) Applicant: New H3C Security Technologies Co., Ltd., Anhui (CN)

(72) Inventor: Tian Xia, Beijing (CN)

(73) Assignee: New H3C Security Technologies Co., Ltd., Anhui (CN)

(*) Notice: Subject to any disclaimer, the term of this patent is extended or adjusted under 35 U.S.C. 154(b) by 67 days.

(21) Appl. No.: 17/271,454

(22) PCT Filed: Aug. 30, 2019

(86) PCT No.: PCT/CN2019/103795
§ 371 (c)(1),
(2) Date: Feb. 25, 2021

(87) PCT Pub. No.: WO2020/043200
PCT Pub. Date: Mar. 5, 2020

(65) Prior Publication Data
US 2021/0306282 A1   Sep. 30, 2021

(30) Foreign Application Priority Data
Aug. 31, 2018   (CN) .......................... 201811012726.1

(51) Int. Cl.
*H04L 12/927* (2013.01)
*H04L 47/80* (2022.01)
(Continued)

(52) U.S. Cl.
CPC ........ *H04L 47/805* (2013.01); *H04L 43/0882* (2013.01); *H04L 45/30* (2013.01); *H04L 45/745* (2013.01)

(58) Field of Classification Search
CPC ... H04L 47/805; H04L 43/0882; H04L 45/30; H04L 45/745; H04L 43/026;
(Continued)

(56) References Cited

U.S. PATENT DOCUMENTS

| | | | | |
|---|---|---|---|---|
| 6,157,644 A | * | 12/2000 | Bernstein | ................ H04L 45/00 |
| | | | | 370/392 |
| 6,577,628 B1 | * | 6/2003 | Hejza | .................. H04L 12/2856 |
| | | | | 370/395.21 |

(Continued)

FOREIGN PATENT DOCUMENTS

| | | |
|---|---|---|
| CN | 102833169 A | 12/2012 |
| CN | 102984069 A | 3/2013 |

(Continued)

OTHER PUBLICATIONS

International Search Report dated Nov. 25, 2019, issued in connection with International Application No. PCT/CN2019/103795, filed on Aug. 30, 2019, 5 pages.

(Continued)

*Primary Examiner* — Wutchung Chu
(74) *Attorney, Agent, or Firm* — McDonnell Boehnen Hulbert & Berghoff LLP

(57) ABSTRACT

A method and apparatus for establishing a fast-forwarding table are provided. The method comprises: when a communication packet is received, determining, according to matching rules of services set in a packet processing policy, a target service matching the communication packet; if a fast-forwarding table corresponding to the communication packet is not stored locally, obtaining a preset target priority of the target service, and determining a target resource utilization threshold corresponding to the target priority according to a preset correspondence between priorities and resource utilization thresholds; determining whether a current resource utilization is greater than the target resource (Continued)

utilization threshold; and establishing a fast-forwarding table corresponding to the communication packet if the current resource utilization is not greater than the target resource utilization threshold. With this disclosure, the memory pressure of the network device can be reduced, and the network device can be avoided to hang or restart.

20 Claims, 7 Drawing Sheets

(51) Int. Cl.
*H04L 43/0882* (2022.01)
*H04L 45/30* (2022.01)
*H04L 45/745* (2022.01)

(58) Field of Classification Search
CPC ............ H04L 41/5006; H04L 41/5022; H04L 45/742; H04L 47/2408; H04L 45/02
See application file for complete search history.

(56) References Cited

U.S. PATENT DOCUMENTS

| | | | |
|---|---|---|---|
| 9,351,193 B2* | 5/2016 | Raleigh | G06Q 40/00 |
| 2003/0072318 A1 | 4/2003 | Lam et al. | |
| 2012/0221955 A1* | 8/2012 | Raleigh | H04W 4/24 |
| | | | 726/1 |
| 2013/0100958 A1* | 4/2013 | Jalan | H04L 67/10 |
| | | | 370/401 |
| 2014/0112130 A1* | 4/2014 | Yang | H04L 49/25 |
| | | | 370/230 |
| 2015/0365537 A1 | 12/2015 | Kahn | |
| 2017/0207976 A1* | 7/2017 | Rovner | H04L 45/54 |
| 2019/0259097 A1* | 8/2019 | Raleigh | H04M 15/00 |
| 2020/0213156 A1* | 7/2020 | Cheng | H04L 12/5601 |
| 2022/0201587 A1* | 6/2022 | Edmondson | H04W 40/24 |

FOREIGN PATENT DOCUMENTS

| | | |
|---|---|---|
| CN | 103024874 A | 4/2013 |
| CN | 103763194 A | 4/2014 |
| CN | 104579961 A | 4/2015 |
| CN | 105208585 A | 12/2015 |
| CN | 106559336 A | 4/2017 |
| CN | 107070693 A | 8/2017 |
| CN | 107786450 A | 3/2018 |
| EP | 1 909 437 B1 | 5/2010 |
| EP | 3324586 A1 | 5/2018 |
| JP | 2007028035 A | 2/2007 |

OTHER PUBLICATIONS

Written Opinion dated Nov. 25, 2019, issued in connection with International Application No. PCT/CN2019/103795, filed on Aug. 30, 2019, 3 pages.

* cited by examiner

ESTABLISHMENT OF FAST FORWARDING TABLE

CROSS-REFERENCE TO RELATED APPLICATIONS

The present application is a U.S. National Phase Application under 35 U.S.C. § 371 of International Application No. PCT/CN2019/103795 filed Aug. 30, 2019, which claims a-priority to Chinese patent application No. 201811012726.1, filed with the China National Intellectual Property Administration on Aug. 31, 2018 and entitled "Method and apparatus for establishing a fast-forwarding table", the disclosure of each of which is incorporated herein by reference in its entirety.

BACKGROUND

Currently, a network device disposed in network generally include an access switch, an aggregation switch, and a core switch. The user terminal may access the access switch so as to implement data transmission between a user terminal and an external network, wherein the access switch is connected with the aggregation switch, the aggregation switch is connected with the core switch, the core switch is connected with an egress router and the egress router is connected with the external network.

The network device (such as the core switch) is usually provided with a fast-forwarding function. A process of processing a packet by the network device is as follows.

After one communication packet is received by the network device, if a fast-forwarding table corresponding to the communication packet has not been established, the network device forwards the communication packet by looking up a routing table and then generates the fast-forwarding table corresponding to the communication packet in a local cache. The fast-forwarding table may include information such as quintuple information, an inbound interface, and an outbound interface of the communication packet. The network device can identify packets belonging to the same data stream according to information in the packets, such as quintuple information. Subsequently, if the network device receives a communication packet with the same quintuple information as the above communication packet (that is, they belongs to the same data stream), the network device forwards the packet through the fast-forwarding table, without searching the routing table. In this way, the time of packet forwarding can be reduced, and the efficiency of packet forwarding can be improved.

DETAILED DESCRIPTION

In order to make the above purposes, features and advantages of the application more clearly and understandable, the following is a further detailed description of the disclosure in connection with the drawings and detailed description.

An example of the present disclosure provides a method for establishing a fast-forwarding table. The method is applied to a network device which may be an access switch, an aggregation switch, a core switch, and so on. The network device may also be a physical device such as a router, a firewall, an AC (Access Controller) and so on, or a logic device with the above functions. It should be understood that the network device may implement the example of the present disclosure, and the specific form thereof is not specifically limited herein.

Figure 1:
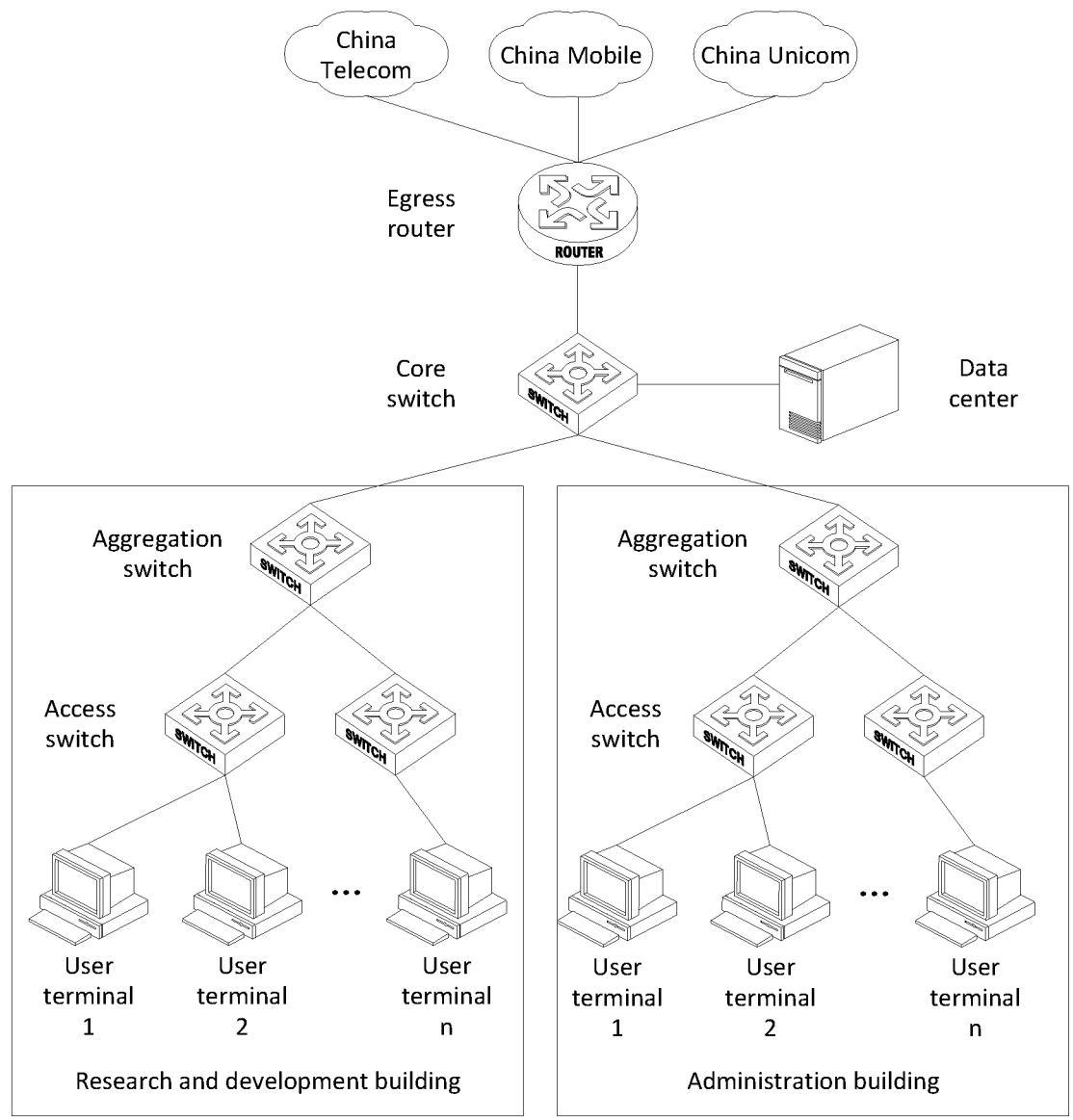
FIG. 1 is a schematic diagram of a network system according to an example of the present disclosure.

The method for establishing a fast-forwarding table may be applied in an application scenario of a campus network. The campus network may include multiple user terminals, for example, a school includes a research and development building and an administration building, and each building may be provided with multiple user terminals. FIG. 1 shows a schematic diagram of a networking architecture of a campus network according to an example of the present disclosure. The networking architecture includes a network device, user terminals in the research and development building and user terminals in the administration building. Each user terminal is connected with the network device and communicates by the network device. On the basis of a function and feature of each part of the network, the campus network may be divided into three parts, i.e., a network egress, a data center and a user access. Accordingly, the campus network may be provided with an egress router, a core switch and an access device. The access device may be the user access part. The egress router may be the network egress part. The core switch is connected with the egress router, the data center and the access device, respectively. The access device may include an access switch and an aggregation switch. The user terminal is connected with the access switch, and the access switch connects the user terminal with the campus network. The access switch is connected with the aggregation switch, and the aggregation switch is connected with the core switch. The core switch forwards a communication packet at high speed to complete data communication between the data center and the user terminals and between the user terminals in the campus network. The core switch may further forward the communication packet to the egress router, and then the egress router forwards the communication packet to an external network, so as to achieve data communication between the internal network and the external network.

After receiving a communication packet, the network device determines a target service matching the communication packet according to a service match rule set in a preset packet processing policy. This process will be described in detail below. After determining the target service matching the communication packet, the network device may obtain a target priority of the target service, and determine a target resource utilization threshold corresponding to the target priority according to a preset correspondence between a priority and a resource utilization threshold. Then, the network device determines whether a current resource utilization is greater than the target resource utilization threshold. If the current resource utilization is not greater than the target resource utilization threshold, the network device establishes a fast-forwarding table corresponding to the communication packet.

In this way, when the current resource utilization is not greater than the target resource utilization threshold, the fast-forwarding table corresponding to the communication packet may be established.

The inventor has found that at least the following problems exist in the prior art. In the related art, after one communication packet is received by the network device, if a fast-forwarding table corresponding to the communication packet has not been established, the network device forwards the communication packet by looking up a routing table and then generates the fast-forwarding table corresponding to the communication packet in a local cache. The fast-forwarding table may include information such as quintuple information, an inbound interface, and an outbound interface of the communication packet. The network device can identify packets belonging to the same data stream according to the information in the packets, such as quintuple information. Subsequently, if the network device receives a communication packet with the same quintuple information as the above communication packet (that is, they belongs to the same data stream), the network device may find the fast-forwarding table corresponding to this packet by the quintuple information of this packet, and forward the packet, without searching the routing table. In this way, the time of packet forwarding can be reduced, and the efficiency of packet forwarding can be improved. However, since a large number of user terminals will be aggregated in the network, a large number of fast-forwarding tables will be established in the network device when the user terminals communicate with each other, which will lead to insufficient memory in the network device, affect the performance of the network device, and even cause the network device to hang or restart.

In an example of the present disclosure, it is possible to selectively establish fast-forwarding tables for communication packets of some data streams, and it is not necessary to establish a fast-forwarding table for a communication packet of each data stream, thereby reducing the memory pressure of the network device and avoiding the network device to hang or restart.

Compared with the prior art in which the fast-forwarding tables are established or closed for all packets, in the example of the present disclosure, it is possible to determine which service packets the fast-forwarding tables may be established for and which service packets the fast-forwarding tables may be not established for, according to the priorities of different services. In an example of the present disclosure, a priority of a service may also be flexibly configured. The network device can determine whether to establish a fast-forwarding table or not according to the configured priority, thereby achieving a flexible establishment of the fast-forwarding table.

In an example of the present disclosure, a process of configuring a priority of each service is described specifically below.

In the process of implementing the above method for establishing a fast-forwarding table, a rule of establishing a fast-forwarding table may be configured in advance in the network device. Specifically, a set of command lines may be newly added so that the network device on which the set of command lines is run establishes or does not establish the fast-forwarding table based on a priority of a service. After the set of command lines is configured and run in a network device, the network device may determine which service packets the fast-forwarding tables may be established for and which service packets the fast-forwarding tables may be not established for, according to the priorities of various services. In an example, a certain command line in the set of command lines is as follows:

[H3C]ip fast-forwarding xx enable //indicating that a rule of establishing a fast-forwarding table, named "xx", is started, wherein "xx" is an identifier of the rule of establishing a fast-forwarding table.

In addition, it is also possible to configure a priority corresponding to each service, and each priority corresponds to a different rule of establishing a fast-forwarding table. Taking three priorities (level 1~3) as an example, level 3 is highest priority, level 2 is medium priority, and level 1 is lowest priority. When a communication packet matching a service with the priority of level 3 is received, a fast-forwarding table is established for the communication packet. When a communication packet matching a service with the priority of level 2 is received, if the resource utilization is less than a resource utilization threshold, a fast-forwarding table corresponding to the communication packet is established, and if the resource utilization is not less than the resource utilization threshold, a fast-forwarding table corresponding to the communication packet is not established or the fast-forwarding table is removed. When a communication packet matching a service with the priority of level 1, a fast-forwarding table is not established for the communication packet.

In an example, the priority of a NAT service may be configured as the highest priority, and a command line in the set of command lines may be as follows:

[H3C-ipf-xx] module NAT level 3 //indicating that the NAT (Network Address Translation) service is set to the highest priority, and the fast-forwarding table may be established.

In an example, the priority of an AFT service may be configured as the highest priority, and a command line in the set of command lines may be as follows:

[H3C-ipf-xx] module AFT level 3 //indicating that the AFT (Address Family Translation) service is set to the highest priority, and the fast-forwarding table may be established.

In an example, the priority of an ASPF service may be configured as the medium priority, and a command line in the set of command lines may be as follows:

[H3C-ipf-xx] module ASPF level 2 //indicating that the ASPF (Advanced Stateful Packet Filter) service is set to the medium priority; when a communication packet matching the ASPF service is received, if the current resource utilization of the network device is less than the preset resource utilization threshold, a fast-forwarding table corresponding to the communication packet is established.

By default, all services belong to level 1, so it is not necessary to configure the service belonging to level 1.

After receiving a command of configuring a priority of a service, the network device will store the priority of the service in configuration information of the service for subsequent processing. The configuration information of the service may further include information such as a matching rule of the service. The matching rule may include a preset matching item, such as quintuple information.

It should be noted that, according to actual requirements, different services may be configured as the same priority, or different services may be configured as different priorities. In addition, the number of the priorities may not limit to three. In the case that there are a plurality of priorities, each of the priorities may correspond to a different resource utilization threshold, which will be described in detail below.

The above configuration method of the priority of each service is only an example. The priority corresponding to each service may be configured by those skilled in the art according to service requirements, which is not limited herein.

In the prior art, the network device will establish fast-forwarding tables for all communication packets by default. In accordance with a method provided by an example of the present disclosure, the network device may determine whether to establish a fast-forwarding table according to a priority of a target service matching the communication packet, or according to a priority of a target service matching the communication packet and a resource utilization threshold corresponding to the priority. Therefore, it is possible to selectively establish fast-forwarding tables for communication packets of some data streams, thereby reducing the memory pressure of the network device and avoiding the network device to hang or restart.

Figure 2:
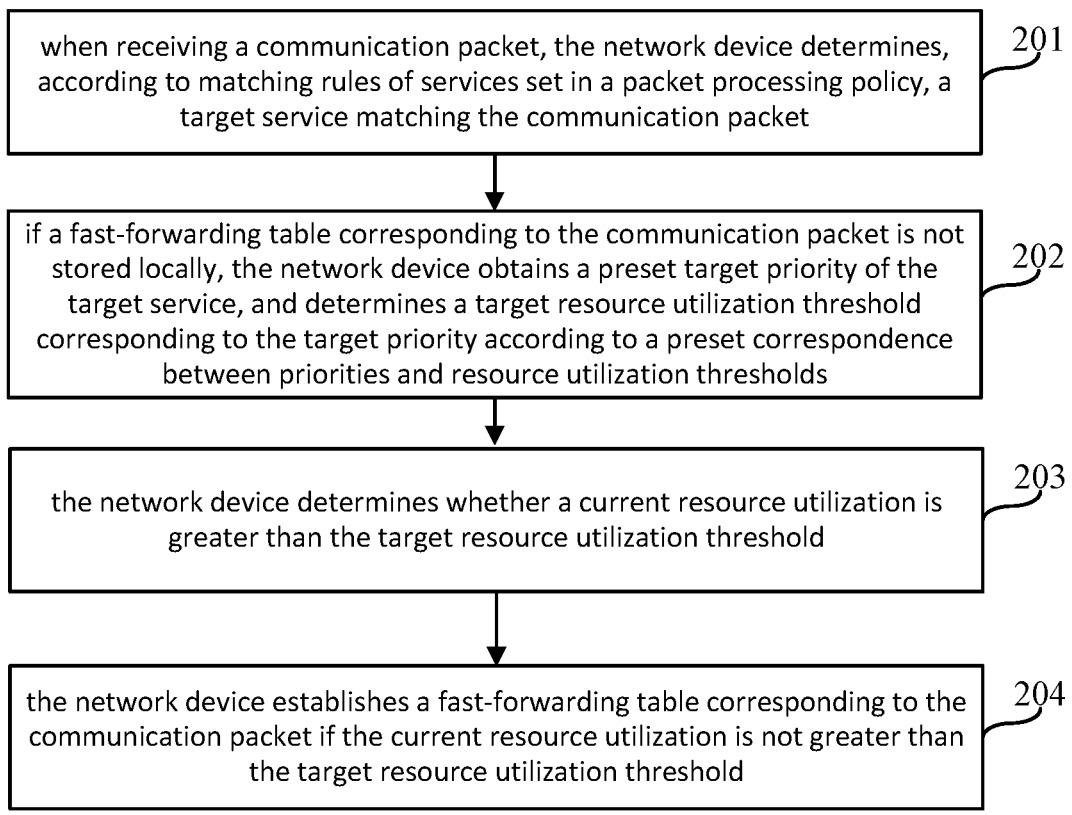
FIG. 2 is a flow diagram of a method for establishing a fast-forwarding table according to an example of the present disclosure.

As shown in FIG. 2, for example, a network device (such as a core switch) in the campus network is taken as an executor, and a method for establishing a fast-forwarding table according to an example of the present disclosure may include the following blocks.

At block 201, when receiving a communication packet, the network device determines a target service matching the communication packet according to matching rules of services set in a packet processing policy.

The target service matching the communication packet may include one target service, or a plurality of target services.

In an example of the present disclosure, the network device may be configured to process multiple services, such as a NAT service, an AFT service, an ASPF service, and so on. A packet processing policy may be provided in the network device in advance. The network device may determine a target service matching a communication packet according to matching rules of services set in the packet processing policy.

In an example, the packet processing policy may include a packet matching flow (that is, a matching order of services), and matching rules of the services. The network device may determine a target service matching the communication packet according to the matching order of services and the matching rules of the services.

In an example of the present disclosure, after receiving a communication packet, the network device may perform matching and service processing on the communication packet in sequence according to the matching order of services and the matching rule of each service, to determine a target service matching the communication packet.

For example, the matching order of the services may be: NAT service→AFT service→ASPF service. The network device may first match the communication packet with the matching rule of the NAT service, then match the communication packet with the matching rule of the AFT service, and finally match the communication packet with the matching rule of the ASPF service. Taking the NAT service as an example, the matching rule of the NAT service may include a preset matching item (such as quintuple information). When the quintuple information of the communication packet does not match the matching item, the matching of the communication packet with the next service, that is, the AFT service is performed. When the quintuple information of the communication packet matches the matching item, this indicates that the communication packet matches the matching rule, and then a corresponding NAT service processing may be performed on the communication packet. After the NAT service processing is performed on the communication packet, the matching of the communication packet with the next service, that is, the AFT service, is performed. The matching of the AFT service and the ASPF service with the communication packet is similar to the matching of the NAT service with the communication packet, with the difference in that their matching items (such as quintuple information) may have different specific contents.

At block 202, if a fast-forwarding table corresponding to the communication packet is not stored locally, the network device obtains a target priority of the target service, and determines a target resource utilization threshold corresponding to the target priority according to a preset correspondence between priorities and resource utilization thresholds.

The fast-forwarding table may include quintuple information, inbound interface information of the packet, outbound interface information of the packet, and so on.

In an example, the network device may obtain quintuple information in the service packet by parsing the service packet, and then match the quintuple information with quintuple information of each of fast-forwarding tables that have been established, to determine whether there is a fast-forwarding table including the quintuple information. If there is a fast-forwarding table including the quintuple information (that is, the fast-forwarding table corresponding to the communication packet), the communication packet may be forwarded according to the fast-forwarding table. If there is not a fast-forwarding table including the quintuple information, the network device may obtain a priority of the target service (that is, the target priority) from the configuration information of the target service (that is, the service matching the communication packet). The network device may store in advance a resource utilization threshold corresponding to each priority, that is, a correspondence between a priority and a resource utilization threshold, which may be set by technical people according to their experiences. The resource utilization may include a memory utilization and/or a CPU utilization.

For example, the priorities of services may include level 1, level 2, level 3 and level 4. The resource utilization threshold corresponding to level 1 is 0%. The fast-forwarding table is not established when the communication packet is processed for the service with the priority of level 1. The resource utilization threshold corresponding to level 2 is 40%. When the communication packet is processed for the service with the priority of level 2, the fast-forwarding table is established in the case that a current resource utilization is less than 40%. The resource utilization threshold corresponding to level 3 is 80%. When the communication packet is processed for the service with the priority of level 3, the fast-forwarding table is established in the case that a current resource utilization is less than 80%. The resource utilization threshold corresponding to level 4 is 100%. The fast-forwarding table is established when the communication packet is processed for the service with the priority of level 4.

The network device may determine a target resource utilization threshold corresponding to a target priority according to a preset correspondence between priorities and resource utilization thresholds. For example, after receiving a communication packet, the network device determines that a service matching the communication packet is an ASPF service, the priority corresponding to the ASPF service is level 2, and the target resource utilization threshold corresponding to level 2 is 40%.

At block 203, the network device determines whether a current resource utilization is greater than the target resource utilization threshold.

In an example of the present disclosure, the network device may obtain the current resource utilization, and then determine whether the current resource utilization is greater than or equal to the target resource utilization threshold.

At block 204, if the current resource utilization is not greater than the target resource utilization threshold, the network device establishes a fast-forwarding table corresponding to the communication packet.

In an example of the present disclosure, if the network device determines that the current resource utilization is less than or equal to the resource utilization threshold, it indicates that the current resource utilization is low, and the network device can allocate more resources for processing the current service. The network device thus may establish the fast-forwarding table corresponding to the communication packet.

Specifically, the network device determines an inbound interface of the communication packet, and then determine an interface type and an interface number of the inbound interface. The network device may further query a corresponding outbound interface in a local routing table according to a destination IP address and a destination port number of the communication packet, and then determine the interface type and the interface number of the outbound interface. Then, the network device may generate the fast-forwarding table according to quintuple information of the communication packet, the interface type and the interface number of the inbound interface for receiving the communication packet, and the interface type and the interface number of the outbound interface for forwarding the communication packet. The fast-forwarding table may be shown as Table 1.

tion packet is: source IP address 1.1.1.1, source port number 10, destination IP address 2.2.2.2, destination port number 20, protocol TCP (Transmission Control Protocol). If the network device has not establish a fast-forwarding table corresponding to the communication packet, and the current resource utilization is less than the target resource utilization threshold, the network device may establish the fast-forwarding table as shown in Table 1.

In addition, the fast-forwarding table may further include fields such as a total number of fast-forwarding tables that have been established currently, an internal flag, and so on (not shown in Table 1). The internal flag is used to indicate whether the communication packet has been segmented. For example, when the internal flag is 1, it indicates that the communication packet has been segmented; when the internal flag is 0, it indicates that the communication packet has not been segmented.

In this way, after receiving a communication packet with the same quintuple information (that is a communication packet belonging to the same data stream with the above communication packet) as the above communication packet subsequently, the network device may forward this packet by searching the fast-forwarding table without searching the routing table, which can reduce the time of packet forwarding and improve the efficiency of packet forwarding.

In an example, when receiving a communication packet, the network device may establish a temporary forwarding table corresponding to the communication packet. The temporary forwarding table may be converted into the fast-forwarding table. The process of establishing a fast-forwarding table by the network device includes: removing a temporary flag in the temporary forwarding table, and establishing an association between a session corresponding to the communication packet and the temporary forwarding table, to obtain the fast-forwarding table corresponding to the communication packet.

In an example of the present disclosure, when receiving a first communication packet, the network device generates a temporary forwarding table corresponding to the communication packet. Specifically, the network device obtains quintuple information of the communication packet by parsing the communication packet. The network device may further determine an inbound interface of the communication packet, and then determine an interface type and an interface number of the inbound interface. The network device may further search for a corresponding outbound interface in a local routing table according to a destination IP address and a destination port number of the communication packet and then determine the interface type and the interface number of the outbound interface. Then the network device may generate a temporary forwarding table based on the quin-

TABLE 1

| Index | Source IP address | Source port number | Destination IP address | Destination port number | Protocol | Interface type and interface number of the inbound interface | Interface type and interface number of the outbound interface |
|---|---|---|---|---|---|---|---|
| 1 | 1.1.1.1 | 10 | 2.2.2.2 | 20 | TCP | GE1/1 | GE 1/2 | where GE indicates that the interface type is GigabitEthernet, that is, an interface with a rate of 1G bps, "1/1" in GE1/1 is the interface number, and indicates a first interface on a first board (card slot).

For example, the network device receives a communication packet, and quintuple information of the communication packet, the interface type and the interface number of the inbound interface of the communication packet, and the interface type and the interface number of the outbound interface of the communication packet. The temporary forwarding table may be shown as Table 2.

TABLE 2

| Index | Source IP address | Source port number | Destination IP address | Destination port number | Protocol | Interface type and interface number of the inbound interface | Interface type and interface number of the outbound interface | Temporary flag |
|---|---|---|---|---|---|---|---|---|
| 1 | 1.1.1.1 | 10 | 2.2.2.2 | 20 | TCP | GE1/1 | GE1/2 | 1 |

The difference between the temporary forwarding table and the fast-forwarding table is that the temporary forwarding table includes a temporary flag field, in addition to the fields in the fast-forwarding table. The temporary flag indicates that the table is temporary. For example, the temporary flag may be 1, which indicates that the table is temporary. The network device establishes a session (which may be referred to as a target session) corresponding to the communication packet according to the temporary forwarding table. The session generally includes information of session initiator, information of session responder, session establishment time, and so on. For example, the session established based on the temporary forwarding table shown in Table 2 may include:

the information of the session initiator: source IP address/source port number: 1.1.1.1/10, destination IP address/destination port number: 2.2.2.2/20, protocol: TCP, interface type and interface number of the inbound interface of the packet: GE1/1, source security domain: Management, wherein the source security domain may be determined according to the interface type and interface number of the inbound interface of the packet;

the information of the session responder: source IP address/source port number: 2.2.2.2/20, destination IP address/destination port number: 1.1.1.1/10, protocol: TCP, interface type and interface number of the outbound interface of the packet: GE1/2, and source security domain: Local, wherein the source security domain may be determined according to the interface type and interface number of the outbound interface of the packet;

session state: TCP session has been established;

session start time: 2018-07-10 14:06:53, and session lifetime:1199s;

the number of data packets sent by the session initiator to the session responder: 459 packets, and the number of bytes: 18555 bytes; and the number of data packets sent by the session responder to the session initiator: 958 packets, and the number of bytes: 42151 bytes.

The network device may record a data transmission status of two communicating parties by establishing a session, and forward the received communication packet according to the session. In an example of the present disclosure, for one communication packet, the network device established one session and one fast-forwarding table.

If the network device determines that a current resource utilization is not greater than a target resource utilization threshold, the network device performs formalization processing on the temporary forwarding table, that is, converts the temporary forwarding table into a formal fast-forwarding table. The processing includes establishing an association between a target session and the temporary forwarding table, and removing the temporary flag in the temporary forwarding table.

In an example of the present disclosure, as described above, when receiving the first communication packet sent by a user equipment, the network device establishes a temporary forwarding table corresponding to the first communication packet, and then establishes a session according to the temporary forwarding table. For example, the network device determines that a target service matching the communication packet is an ASPF service. Since it is necessary to establish a session to perform ASPF service processing, the network device will establish the session corresponding to the communication packet according to the temporary forwarding table of the communication packet. The network device may set a pointer to the session in a structure of the temporary forwarding table, and at the same time, set a pointer to the temporary forwarding table in the structure of the session, so as to establish an association between the target session and the temporary forwarding table. Moreover, the network device may further remove the temporary flag field in the temporary forwarding table or set the field to null, so as to obtain the fast-forwarding table corresponding to the communication packet.

In an example, if the current resource utilization is greater than the target resource utilization threshold, the temporary forwarding table corresponding to the communication packet is removed. In another example, if no service matching the communication packet is determined according to the packet processing policy, the temporary forwarding table corresponding to the communication packet is removed.

In an example of the present disclosure, if the network device determines that the current resource utilization is greater than the target resource utilization threshold, it indicates that the network device has a large processing pressure currently, and thus the network device may not be able to allocate more resources to process the current service. Therefore, the network device may remove the temporary forwarding table corresponding to the communication packet and may not establish a fast-forwarding table corresponding to the communication packet. However, the network device may still forward the communication packet. In this way, although the efficiency of packet forwarding is reduced to some extent, it can be ensured that the network device has enough memory to process a service, thereby avoiding the network device to hang or restart.

In an example, if the network device determines no service matching the communication packet according to the packet processing policy, the network device removes the temporary forwarding table corresponding to the communication packet, and does not establish the fast-forwarding table corresponding to the communication packet. At this time, the network device may forward the communication packet according to the routing table. Specifically, the network device searches for, according to a destination IP address of the communication packet, a next hop address corresponding to the destination IP address in the routing table. Then, the network device forwards the communication packet according to the found next hop address. If the network device does not find a next hop address corresponding to the destination IP address in the routing table, the network device may process the communication packet according to a preset processing policy. The processing policy may be configured by technical people according to requirements. For example, the network device may discard this communication packet, or may forward the communication packet according to a preset forwarding path.

In another example, the target priority of the target service obtained by the network device may be the highest priority, the lowest priority, or a priority other than the highest priority and the lowest priority. Thus, the method according to an example of the present disclosure may include the following three cases.

Case 1: if the target priority is the highest priority, the network device may establish the fast-forwarding table corresponding to the communication packet.

Case 2: if the target priority is the lowest priority, the network device may remove the temporary forwarding table corresponding to the communication packet.

Case 3: if the target priority is a priority other than the highest priority and the lowest priority, the network device may determine a target resource utilization threshold corresponding to the target priority according to the preset correspondence between a preset priority and a resource utilization threshold. Then blocks 203-204 are performed, to determine whether to establish a fast-forwarding table of the communication packet.

In an example, when a plurality of target services matching the communication packet are determined, the network device may determine whether to establish a fast-forwarding table corresponding to the communication packet by using the following two methods.

Method 1, the network device determines target priorities of all target services, and respectively determines target resource utilization thresholds corresponding to each of the target priorities according to the preset correspondence between priorities and resource utilization thresholds. If the current resource utilization is not greater than a maximum threshold in the determined target resource utilization thresholds, the network device establishes the fast-forwarding table corresponding to the communication packet.

In an example of the present disclosure, if the network device determines a plurality of target services matching the communication packet, the network device respectively determines a priority (i.e., a target priority) of each of the target services and a target resource utilization threshold corresponding to this target priority, so as to obtain a plurality of target resource utilization thresholds. The network device may determine a maximum threshold in the plurality of target resource utilization thresholds, and then determine whether the current resource utilization is greater than the maximum threshold. If the current resource utilization is not greater than the maximum threshold, the network device establishes the fast-forwarding table corresponding to the communication packet. For example, the services matching the communication packet include NAT service and ASPF service, the resource utilization threshold corresponding to the ASPF service is 80%, the resource utilization threshold corresponding to the NAT service is 100%, and the current resource utilization is 85%. The network device determines that the current resource utilization is less than the resource utilization threshold corresponding to the NAT service, i.e. 85%<100%, and thus establishes the fast-forwarding table of the communication packet.

Method 2, in a process of determining a target service matching the communication packet according to the packet processing policy, each time when the network device determines the target service matching the communication packet, the network device performs the target service on the communication packet, obtains a target priority of the target service, determines a target resource utilization threshold corresponding to the target priority according to the preset correspondence between priorities and resource utilization thresholds, and determines whether the current resource utilization is greater than the target resource utilization threshold.

If the current resource utilization is greater than the target resource utilization threshold, it is further determined whether the target service is the last service in the matching order.

If the target service is not the last service in the matching order, the communication packet may be matched with the higher priority service subsequently (that is, the fast-forwarding table may be established subsequently). Therefore, at this time, the temporary forwarding table is not processed, which may prevent the temporary forwarding table from being removed mistakenly and avoid that a fast-forwarding table cannot be established without the temporary forwarding table subsequently. The network device may match the communication packet with a matching rule of an unmatched service in the services according to the matching order of services, and determine a next target service matching the communication packet.

If the service is the last service in a packet matching flow, the temporary forwarding table corresponding to the communication packet is removed.

If the current resource utilization is not greater than the target resource utilization threshold, it is further determined whether the fast-forwarding table corresponding to the communication packet has been established. If the fast-forwarding table corresponding to the communication packet has been not established, the fast-forwarding table corresponding to the communication packet is established. The process of establishing the fast-forwarding table may include: removing the temporary flag in the temporary forwarding table, and establishing an association between a session corresponding to the communication packet and the temporary forwarding table, to obtain the fast-forwarding table corresponding to the communication packet. Subsequently, when the network device determines the service matching the communication packet, the network device may perform service processing and may not determine whether to establish the fast-forwarding table.

For example, in a packet matching flow, it is necessary to sequentially match ASPF service, NAT service and AFT service with the communication packet. The resource utilization threshold corresponding to the ASPF service is 40%, the resource utilization threshold corresponding to the NAT service is 100%, the resource utilization threshold corresponding to the AFT service is 80%, and the current resource utilization is 80%. When the communication packet matches the ASPF service, the network device determines that the current resource utilization is greater than the target resource utilization threshold of 40%. At this time, since the ASPF service is not the last service in the packet matching flow, the network device may perform ASPF service processing on the communication packet and may not process the temporary forwarding table, to prevent the temporary forwarding table from being removed mistakenly. The network device continues to match the communication packet with a next service, and establishes a fast-forwarding table when determining that the communication packet matches the NAT service.

In this way, when the matching of all services are finished, if the current resource utilization is not greater than the maximum threshold in the determined target resource utilization thresholds, the fast-forwarding table corresponding to the communication packet is established; if the current resource utilization is greater than the maximum threshold in the determined target resource utilization thresholds, the temporary forwarding table corresponding to the communication packet is removed.

In an example, the network device may further remove a part of the fast-forwarding tables that have been established when the current resource utilization is too high, so as to reduce the memory pressure of the network device and avoid the network device to hang or restart. Specifically, if the current resource utilization is greater than the target resource utilization threshold, one or more first services for each of the fast-forwarding tables is determined according to a preset association between fast-forwarding tables and services, and the highest priority in the one or more priorities of the one or more first services for each of the fast-forwarding tables is determined; a first priority which is lower than or equal to the target priority is determined from the determined highest priorities; and a target fast-forwarding table, in which the highest priority in one or more priorities of one or more services associated with the target fast-forwarding table is the first priority, is determined from the fast-forwarding tables and the target fast-forwarding table is removed.

In an example of the present disclosure, a session generally includes a field (which may be referred to as a first field) of a service associated with the session. After establishing a session, the network device may record an identification of a service associated with the session in the first field. For example, if the network device establishes a session when performing the ASPF service processing, the network device may record an identification of the ASPF service in the first field of the session. Subsequently, the network device may need to invoke the session when performing another target service (that is, the network device performs the target service based on information recorded by the session). At this time, the network device may also record the identification of the target service that invokes the session in the first field. In this way, the network device can establish an association between the session and the service. Then the network device may obtain an association between the temporary forwarding table and the service based on the above established association between the session and the temporary forwarding table. Accordingly, after converting the temporary forwarding table into a fast-forwarding table, the network device may obtain a preset association between the fast-forwarding table and the service.

For example, the network device may establish a temporary forwarding table S of the communication packet, and establish a session M according to the temporary forwarding table S when preforming the ASPF service processing. Then the network device records an identification of the ASPF service in the first field of the session M, to establish an association between the session M and the ASPF service. If the network device determines that the current resource utilization is not greater than the target resource utilization threshold, the network device performs formalization processing on the temporary forwarding table S, that is, sets a pointer to the session M in the structure of the temporary forwarding table S, and sets a pointer to the temporary forwarding table S in the structure of the session M, so as to establish an association between the session M and the temporary forwarding table S. Moreover, the network device removes a temporary flag field in the temporary forwarding table or sets the field to null, so as to obtain a fast-forwarding table S' corresponding to the communication packet. Since the pointer to the session M is set in the structure of the fast-forwarding table and the identification of the ASPF service is recorded in a first field of the session M, the association between the fast-forwarding table S' and the ASPF service can be established.

The network device may also respectively record the number of fast-forwarding tables corresponding to each of services. For each of the services, the network device may count the number of fast-forwarding tables associated with this service according to a preset association between fast-forwarding tables and services, to obtain a priority table of the fast-forwarding table. The priority table of the fast-forwarding table may further include a name of a service supported by the network device and a priority of each service. The priority table of the fast-forwarding table may be shown as Table 3.

TABLE 3

| Service | Priority | The number of fast-forwarding tables |
|---|---|---|
| NAT service | level 4 | 10 |
| AFT service | level 3 | 3 |
| ASPF service | level 2 | 0 |
| URPF service | level 1 | 0 |
| . . . | . . . | . . . | where, URPF indicates unicast Reverse Path Forwarding.

In an example of the present disclosure, a priority table of a fast-forwarding table is added, so that the services are hierarchically authorized. The network device may selectively establish a fast-forwarding table for data streams of different services according to different priorities of different services. That is, the network device can establish a fast-forwarding table for a packet with demand, thereby saving the memory of the network device, fully utilizing the function and performance of the network device, and improving the use efficiency of the network device.

It should be noted that, in case that there are a plurality of target services, after establishing a fast-forwarding table, the network device will increase the number of fast-forwarding tables for each of the target services by one. For example, the target services matching the communication packet are NAT service, ASPF service and URPF service. After establishing a fast-forwarding table of the communication packet, the network device will increase the number of fast-forwarding tables for NAT service, the number of fast-forwarding tables for ASPF service and the number of fast-forwarding tables for URPF service by one, respectively. Table 4 is obtained by modifying Table 3.

TABLE 4

| Service | Priority | The number of fast-forwarding tables |
|---|---|---|
| NAT service | level 4 | 11 |
| AFT service | level 3 | 3 |
| ASPF service | level 2 | 1 |
| URPF service | level 1 | 1 |
| . . . | . . . | . . . |

When the network device determines that the current resource utilization is greater than the target resource utilization threshold, for each of the established fast-forwarding tables, the network device may determine one or more services associated with this fast-forwarding table according to a preset association between fast-forwarding tables and services, so as to determine priorities corresponding to the one or more services; then, the network device determines the highest priority in these priorities, and compares the highest priority to the target priority corresponding to the target resource utilization threshold; if the highest priority in the priorities of the services associated with this fast-forwarding table is a first priority lower than or equal to the target priority, it indicates that this fast-forwarding table is associated with a less important service, and thus the network device may remove this fast-forwarding table (that is, the target fast-forwarding table); and if the highest priority in the priorities of the services associated with this fast-forwarding table is greater than the target priority, it indicates that the fast-forwarding table is associated with a more important service, and thus the fast-forwarding table is not removed. In this way, when the resource utilization is high, some fast-forwarding tables associated with the less important services are removed, thereby reducing the memory pressure of the network device, avoiding the network device to hang or restart, and ensuring that the communication packet of the more important service can be fast forwarded.

For example, the priorities include level 1, level 2, level 3 and level 4. The resource utilization threshold corresponding to level 1 is 0%. The resource utilization threshold corresponding to level 2 is 40%. The resource utilization threshold corresponding to level 3 is 80%. The resource utilization threshold corresponding to level 4 is 100%. The service corresponding to level 1 is URPF service. The service corresponding to level 2 is ASPF service. The service corresponding to level 3 is AFT service. The service corresponding to level 4 is NAT service. Currently, there is a fast-forwarding table 1, a fast-forwarding table 2, a fast-forwarding table 3 and a fast-forwarding table 4. The services associated with the fast-forwarding table 1 are NAT service and ASPF service. The service associated with the fast-forwarding table 2 is ASPF service. The services associated with the fast-forwarding table 3 are NAT service and URPF service. The services associated with the fast-forwarding table 4 are ASPF service and AFT service. When the target resource utilization threshold is 80% and the target priority is level 3, the network device may determine that the highest priority in the priorities of the services associated with the fast-forwarding table 1 is level 4, the highest priority of the service associated with the fast-forwarding table 2 is level 2, the highest priority in the priorities of the services associated with the fast-forwarding table 3 is level 4, and the highest priority in the priorities of the services associated with the fast-forwarding table 4 is level 3. Then, the network device determines that the highest priority in the priorities of the services associated with the fast-forwarding table 1 is higher than level 3, the highest priority in the priorities of the services associated with the fast-forwarding table 3 is higher than level 3, the highest priority of the service associated with the fast-forwarding table 2 is lower than level 3, and the highest priority in the priorities of the services associated with the fast-forwarding table 4 is equal to level 3. Then, the network device remove the fast-forwarding table 2 and the fast-forwarding table 4.

In an example of the present disclosure, a monitoring of a memory threshold is newly added. When the memory of the network device reaches the memory threshold, a fast-forwarding table corresponding to a service module with a lower priority is removed. In this way, although an efficiency of packet forwarding is reduced to some extent, it can be ensured that the network device has enough memory to process the service, thereby avoiding the network device to hang or restart.

In an example, after removing the fast-forwarding table, the network device may update the number of fast-forwarding tables corresponding to each of the services in the above Table 3 according to a preset association between current fast-forwarding tables and services. For example, the network device determines to remove the fast-forwarding table 1, and the services associated with the fast-forwarding table 1 are ASPF service and URPF service. The network device may decrease the number of fast-forwarding tables corresponding to the ASPF service and URPF service in Table 3 by one, respectively.

In another example, if the network device determines that the target priority is the highest priority, the network device may establish the fast-forwarding table corresponding to the communication packet. If the network device determines that the target priority is the lowest priority, the network device may not establish the fast-forwarding table corresponding to the communication packet. If the network device determines that the target priority is a priority other than the highest priority and the lowest priority, the network device may perform the operation of determining a target resource utilization threshold corresponding to the target priority according to a preset correspondence between priorities and resource utilization thresholds in the block 202. In this way, the processing amount of the network device may be reduced, and the processing resource of the network device may be saved.

The present disclosure further provides an example of a method for establishing a fast-forwarding table. In this example, there are four priorities, i.e., levels 1 to 4.

The level 4 is the highest priority. A resource utilization threshold corresponding to the level 4 is 100%. For a service with a priority of level 4, a fast-forwarding table is established when a communication packet is processed.

The level 3 is the medium priority. A resource utilization threshold corresponding to the level 3 is 80%. For a service with a priority of level 3, when a communication packet is processed, a fast-forwarding table is established if the current resource utilization is less than or equal to 80%, and a fast-forwarding table is not established or the fast-forwarding table is removed if the current resource utilization is greater than 80%.

The level 2 is the medium priority. The resource utilization threshold corresponding to the level 2 is 60%. For a service with a priority of level 2, when a communication packet is processed, a fast-forwarding table is established if the current resource utilization is less than or equal to 60%, and a fast-forwarding table is not established or the fast-forwarding table is removed if the current resource utilization is greater than 60%.

The level 1 is the lowest priority. The resource utilization threshold corresponding to the level 1 is 0. For a service with a priority of level 1, a fast-forwarding table is not established when a communication packet is processed.

As shown in FIG. 1, the campus network includes a network device, user terminals in the research and development building and user terminals in the administration building. Each of the user terminals is connected with the network device and communicates by the network device. Based on the function and feature of each part of the network, the campus network may be divided into three parts, i.e., a network egress, a data center and a user access. Accordingly, the campus network may be provided with an egress router, a core switch and an access device. The access device corresponds to the user access part. The egress router corresponds to the network egress part. The core switch is respectively connected with the egress router, the data center and the access device. The access device may include an access switch and an aggregation switch. The access switch connects the user terminal with the campus network. The access switch is connected with the aggregation switch and the aggregation switch is connected with the core switch. The core switch forwards communication packet at high speed to complete data communication between the data center and the user terminals and between the user terminals in the campus network. The core switch may further forward the communication packet to the egress router, and the egress router forwards the communication packet to an external network, so as to achieve data communication between the internal network and the external network.

The method for establishing a fast-forwarding table according to the example of the present disclosure may be performed by the core switch in the campus network. For example, a user terminal in the research and development building sends a communication packet to a user terminal in the administration building. The user terminal in the research and development building sends a communication packet to the access switch. The access switch sends the communication packet to the aggregation switch and the aggregation switch sends the communication packet to the core switch. The core switch forwards the communication packet to the user terminal in the administration building by performing the method for establishing the fast-forwarding table according to the example of the present disclosure.

Figure 3:
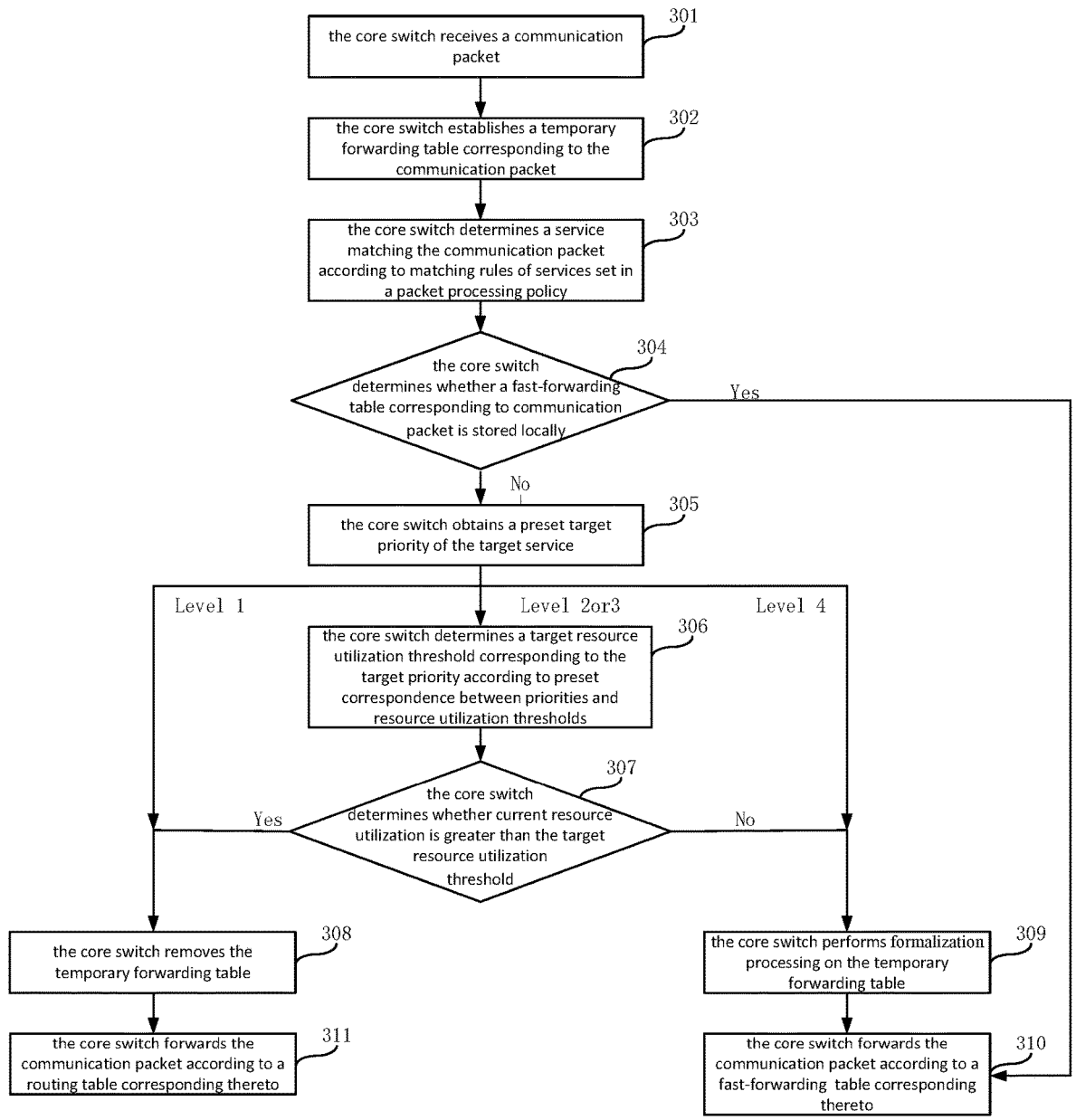
FIG. 3 is a flow diagram of a method for establishing a fast-forwarding table according to an example of the present disclosure.

As shown in FIG. 3, the specific process of the example is as follows.

At block 301, the core switch receives a communication packet.

The block may be referred to the related description in the above block 201, which is not described herein again.

At block 302, the core switch establishes a temporary forwarding table corresponding to the communication packet.

The block may be referred to the related description in the above block 204, which is not described herein again.

At block 303, the core switch determines a target service matching the communication packet according to matching rules of services set in a packet processing policy.

The block may be referred to the related description in the above block 201. In this example, the number of target services is one. This is similar to the case that there are a plurality of target services and will not be described again.

At block 304, the core switch determines whether a fast-forwarding table corresponding to the communication packet is stored locally.

If the fast-forwarding table corresponding to the communication packet is not stored locally, block 305 is performed; if the fast-forwarding table corresponding to the communication packet is stored locally, block 310 is performed.

The block may be referred to the related description in the above block 204, which is not described herein again.

At block 305, the core switch obtains a preset target priority of the target service.

If the target priority is level 4, block 309 is performed. If the target priority is level 3 or level 2, blocks 306-307 are performed. If the target priority is level 1, block 308 is performed.

The block may be referred to the related description in the above block 202, which is not described herein again.

At block 306, the core switch determines a target resource utilization threshold corresponding to the target priority according to a correspondence between preset priorities and resource utilization thresholds.

The block may be referred to the related description in the above block 202, which is not described herein again.

At block 307, the core switch determines whether a current resource utilization is greater than the target resource utilization threshold.

If the resource utilization is greater than the target resource utilization threshold, block 308 is performed. If the resource utilization is less than or equal to the target resource utilization threshold, the block 309 is performed.

The block may be referred to the related description in the above block 203, which is not described herein again.

At block 308, the core switch removes the temporary forwarding table.

The block may be referred to the related description in the above block 204, which is not described herein again.

At block 309, the core switch performs formalization processing on the temporary forwarding table.

The block may be referred to the related description in the above block 204, which is not described herein again.

At block 310, the core switch forwards the communication packet according to the fast-forwarding table corresponding to the communication packet.

The block may be referred to the related description in the above block 204, which is not described herein again.

At block 311, the core switch forwards the communication packet according to the routing table corresponding to the communication packet.

The block may be referred to the related description in the above block 204, which is not described herein again.

In the method for establishing a fast-forwarding table according to the example of the present disclosure, when receiving a communication packet, the network device determines a target service matching the communication packet according to matching rules of services set in a packet processing policy. If a fast-forwarding table corresponding to the communication packet is not stored locally, a preset target priority of the target service is obtained, and a target resource utilization threshold corresponding to the target priority is determined according to a preset correspondence between priorities and resource utilization thresholds. Then, the network device determines whether a current resource utilization is greater than the target resource utilization threshold. If the current resource utilization is not greater than the target resource utilization threshold, the fast-forwarding table corresponding to the communication packet is established. In this way, when the current resource utilization is not greater than the target resource utilization threshold, the fast-forwarding table corresponding to the communication packet may be established. By applying the example of the present disclosure, it is possible to selectively establish fast-forwarding tables for communication packets of some data streams and it is unnecessary to establish a fast-forwarding table for a communication packet of each data stream, thereby reducing the memory pressure of the network device and avoiding the network device to hang or restart.

Figure 4:
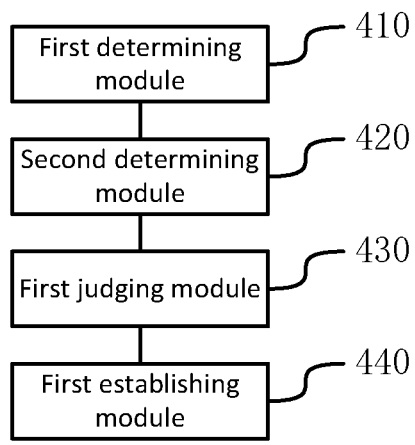
FIG. 4 is a schematic structural diagram of an apparatus of establishing a fast-forwarding table according to an example of the present disclosure.

On the basis of the same technical concept, as shown in FIG. 4, an example of the present disclosure further provides an apparatus of establishing a fast-forwarding table. The apparatus includes a first determining module 410, a second determining module 420, a first judging module 430 and a first establishing module 440.

The first determining module 410 is to determine, when a communication packet is received, a target service matching the communication packet according to matching rules of services set in a packet processing policy.

The second determining module 420 is to, if a fast-forwarding table corresponding to the communication packet is not stored locally, obtain a preset target priority of the target service, and determine a target resource utilization threshold corresponding to the target priority according to a preset correspondence between priorities and resource utilization thresholds.

The first judging module 430 is to determine whether a current resource utilization is greater than the target resource utilization threshold.

The first establishing module 440 is to establish the fast-forwarding table corresponding to the communication packet if the current resource utilization is not greater than the target resource utilization threshold.

Figure 5:
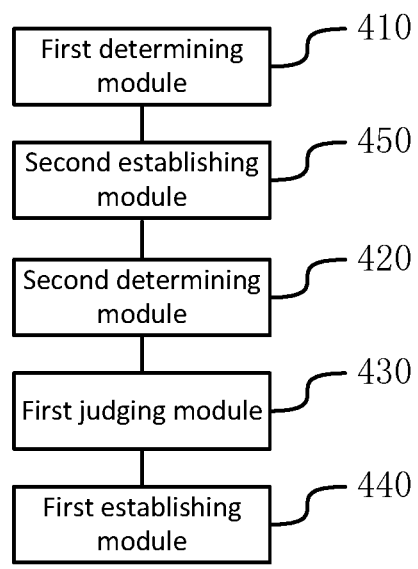
FIG. 5 is a schematic structural diagram of an apparatus of establishing a fast-forwarding table according to an example of the present disclosure.

In an example, as shown in FIG. 5, the apparatus further includes:

a second establishing module 450 to establish a temporary forwarding table corresponding to the communication packet when the communication packet is received.

The first establishing module 440 is to:

remove a temporary flag in the temporary forwarding table, and establish an association between a session corresponding to the communication packet and the temporary forwarding table to obtain the fast-forwarding table corresponding to the communication packet.

Figure 6:
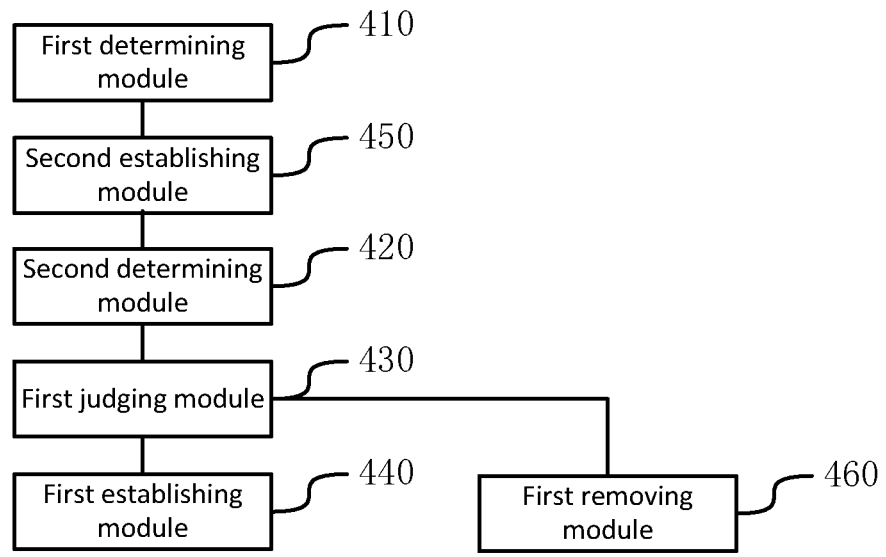
FIG. 6 is a schematic structural diagram of an apparatus of establishing a fast-forwarding table according to an example of the present disclosure.

In an example, as shown in FIG. 6, the apparatus further includes:

a first removing module 460 to remove the temporary forwarding table corresponding to the communication packet, if the current resource utilization is greater than the target resource utilization threshold;

or remove the temporary forwarding table corresponding to the communication packet, if no service matching the communication packet is determined according to the packet processing policy.

In an example, when a plurality of target services matching the communication packet are determined, the first establishing module 440 is to:

establish the fast-forwarding table corresponding to the communication packet, if the current resource utilization is not greater than a maximum threshold in determined target resource utilization thresholds.

Figure 7:
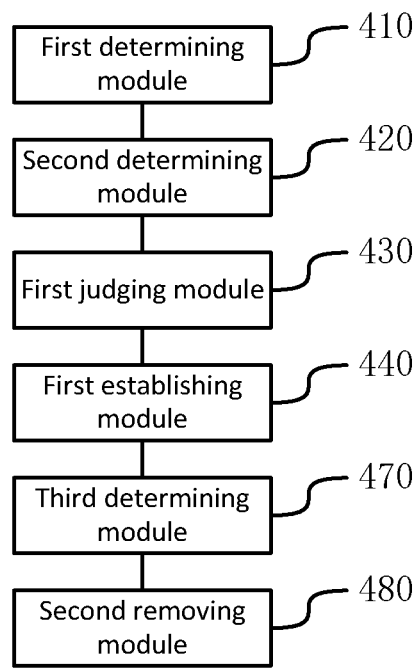
FIG. 7 is a schematic structural diagram of an apparatus of establishing a fast-forwarding table according to an example of the present disclosure.

In an example, as shown in FIG. 7, the apparatus further includes:

a third determining module 470 to, if the current resource utilization is greater than the target resource utilization threshold, determine, according to a preset association between fast-forwarding tables and services, one or more first services for each of fast-forwarding tables that have been currently established, and determining the highest priority in one or more priorities of the one or more first services for each of the fast-forwarding tables; and a second removing module 480 to determine, from the determined highest priorities, a first priority which is lower than or equal to the target priority, and determine, from the fast-forwarding tables, a target fast-forwarding table wherein the highest priority in one or more priorities of one or more services associated with this target fast-forwarding table is the first priority, and remove this target fast-forwarding table.

Figure 8:
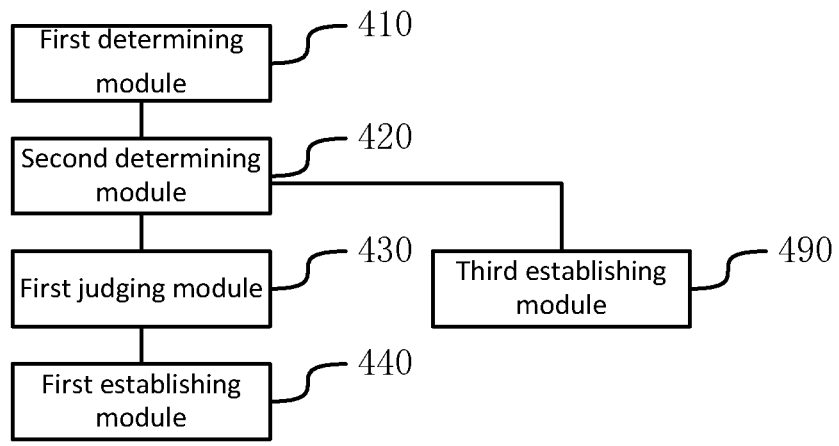
FIG. 8 is a schematic structural diagram of an apparatus of establishing a fast-forwarding table according to an example of the present disclosure.

In an example, as shown in FIG. 8, the apparatus further includes:

a third establishing module 490 to establish the fast-forwarding table corresponding to the communication packet if the target priority is the highest priority; and establish no fast-forwarding table corresponding to the communication packet if the target priority is the lowest priority;

wherein the third establishing module 490 is further to trigger the second determining module to determine the target resource utilization threshold corresponding to the target priority according to the preset correspondence between priorities and resource utilization thresholds, if the target priority is a priority other than the highest priority and the lowest priority.

In an example, the packet processing policy comprises a matching order of services and matching rules of the services.

Figure 9:
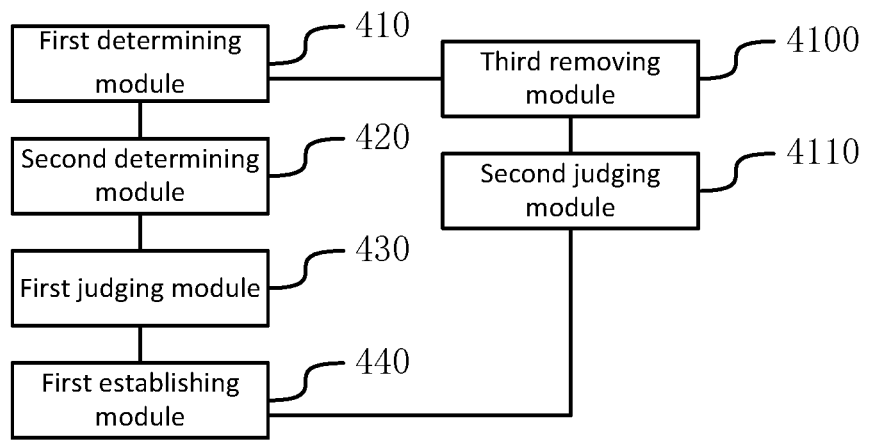
FIG. 9 is a schematic structural diagram of an apparatus of establishing a fast-forwarding table according to an example of the present disclosure.

As shown in FIG. 9, the apparatus further includes:

a third removing module 4100 to determine whether the target service is the last service in the matching order if the current resource utilization is greater than the resource utilization threshold; determine a next target service matching the communication packet by matching the communication packet with a matching rule of an unmatched service in the services according to the matching order of the services, if the target service is not the last service in the matching order; and remove a temporary forwarding table corresponding to the communication packet, if the target service is the last service in the matching order; and a second judging module 4110 to determine whether the fast-forwarding table corresponding to the communication packet has been established, if the current resource utilization is not greater than the target resource utilization threshold; and trigger the first establishing module to establish the fast-forwarding table corresponding to the communication packet, if the fast-forwarding table corresponding to the communication packet has not been established.

In an example of the present disclosure, when receiving a communication packet, the network device determines a target service matching the communication packet according to matching rules of services set in a packet processing policy. If a fast-forwarding table corresponding to the communication packet is not stored locally, a preset target priority of the target service is obtained, and a target resource utilization threshold corresponding to the target priority is determined according to a preset correspondence between priorities and resource utilization thresholds. Then, the network device determines whether a current resource utilization is greater than the target resource utilization threshold. If the current resource utilization is not greater than the target resource utilization threshold, the fast-forwarding table corresponding to the communication packet is established. In this way, when the current resource utilization is not greater than the target resource utilization threshold, the fast-forwarding table corresponding to the communication packet may be established. By applying the example of the present disclosure, it is possible to selectively establish fast-forwarding tables for communication packets of some data streams and it is unnecessary to establish a fast-forwarding table for a communication packet of each data stream, thereby reducing the memory pressure of the network device and avoiding the network device to hang or restart.

Figure 10:
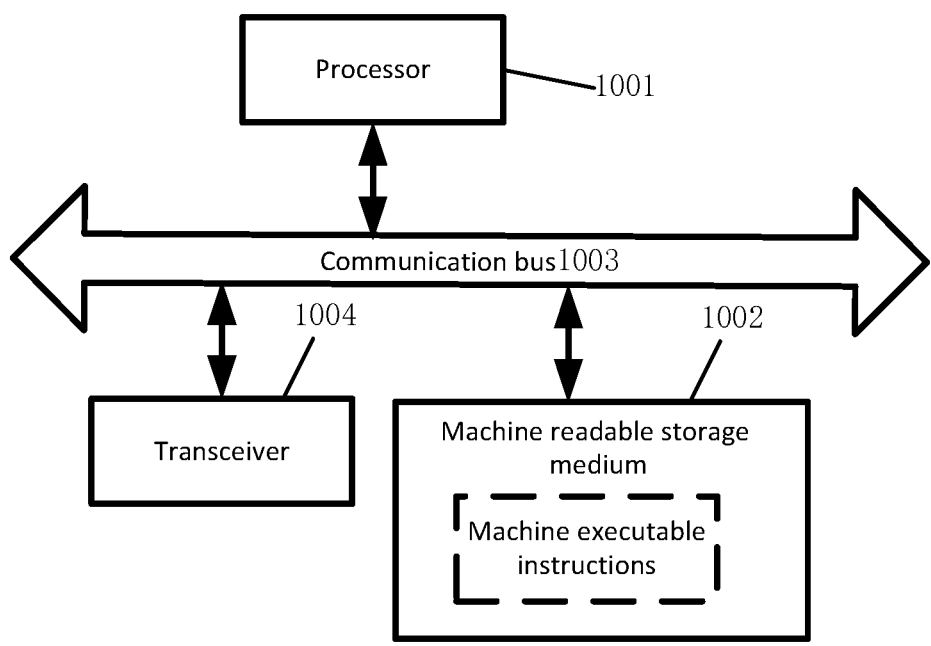
FIG. 10 is a schematic structural diagram of a network device according to an example of the present disclosure.

Corresponding to the above example of the method for establishing a fast-forwarding table, the example of the present disclosure further provides a network device. FIG. 10 shows a structural block diagram of a network device according to an example of the present disclosure. The network device includes: a processor 1001 and a machine readable storage medium 1002. The machine readable storage medium 1002 stores machine executable instructions executed by the processor 1001. The machine executable instructions, when executed by the processor 1001, cause the processor to perform operations of:

when a communication packet is received, determining, according to matching rules of services set in a packet processing policy, a target service matching the communication packet;

if a fast-forwarding table corresponding to the communication packet is not stored locally, obtaining a preset target priority of the target service, and determining a target resource utilization threshold corresponding to the target priority according to a preset correspondence between priorities and resource utilization thresholds;

determining whether a current resource utilization is greater than the target resource utilization threshold; and establishing the fast-forwarding table corresponding to the communication packet if the current resource utilization is not greater than the target resource utilization threshold.

In an example of the present disclosure, the processor 1001 is caused by the machine executable instructions to perform operations of:

establishing a temporary forwarding table corresponding to the communication packet when the communication packet is received; and removing a temporary flag in the temporary forwarding table, and establishing an association between a session corresponding to the communication packet and the temporary forwarding table to obtain the fast-forwarding table corresponding to the communication packet.

In an example of the present disclosure, the processor 1001 is caused by the machine executable instructions to perform operations of:

if the current resource utilization is greater than the target resource utilization threshold, removing the temporary forwarding table corresponding to the communication packet;

or if no service matching the communication packet is determined according to the packet processing policy, removing the temporary forwarding table corresponding to the communication packet.

In an example of the present disclosure, when a plurality of target services matching the communication packet are determined, if the current resource utilization is not greater than the target resource utilization threshold, the processor 1001 is caused by the machine executable instructions to perform an operation of:

if the current resource utilization is not greater than a maximum threshold in determined target resource utilization thresholds, establishing the fast-forwarding table corresponding to the communication packet.

In an example of the present disclosure, the processor 1001 is caused by the machine executable instructions to perform operations of:

if the current resource utilization is greater than the target resource utilization threshold, determining, according to a preset association between fast-forwarding tables and services, one or more first services for each of fast-forwarding tables that have been currently established, and determining the highest priority in one or more priorities of the one or more first services for each of the fast-forwarding tables; and determining, from the determined highest priorities, a first priority which is lower than or equal to the target priority, and determining, from the fast-forwarding tables, a target fast-forwarding table wherein the highest priority in one or more priorities of one or more services associated with the target fast-forwarding table is the first priority, and removing the target fast-forwarding table.

In an example of the present disclosure, after a preset target priority of the target service is obtained, the processor 1001 is caused by the machine executable instructions to perform operations of:

if the target priority is the highest priority, establishing the fast-forwarding table corresponding to the communication packet; if the target priority is the lowest priority, establishing no fast-forwarding table corresponding to the communication packet; and if the target priority is a priority other than the highest priority and the lowest priority, determining the target resource utilization threshold corresponding to the target priority according to the preset correspondence between priorities and resource utilization thresholds.

In an example of the present disclosure, the packet processing policy comprises a matching order of services and matching rules of the services; and the processor 1001 is caused by the machine executable instructions to perform operations of:

if the current resource utilization is greater than the resource utilization threshold, determining whether the target service is the last service in the matching order; if the target service is not the last service in the matching order, determining a next target service matching the communication packet by matching the communication packet with a matching rule of an unmatched service in the services according to the matching order of the services; and if the target service is the last service in the matching order, removing a temporary forwarding table corresponding to the communication packet; and if the current resource utilization is not greater than the target resource utilization threshold, determining whether the fast-forwarding table corresponding to the communication packet has been established; and if the fast-forwarding table corresponding to the communication packet has not been established, establishing the fast-forwarding table corresponding to the communication packet.

As shown in FIG. 10, the network device may further include a communication bus 1003. The processor 1001 and the machine readable storage medium 1002 communicate with each other through the communication bus 1003. The communication bus 1003 may be a Peripheral Component Interconnect (PCI) bus or an Extended Industry Standard Architecture (EISA) bus. The communication bus 1003 may include an address bus, a data bus, a control bus, or the like.

The communication bus 1003 may be connected with the processor 1001, the machine readable storage medium 1002, and may further be connected with a device such as a transceiver 1004.

The machine readable storage medium 1002 may include Random Access Memory (RAM), or may include Non-Volatile Memory (NVM), for example at least one disk memory. Moreover, the machine readable storage medium 1002 may also be at least one storage device located away from the processor described above.

The processor 1001 may be a general-purpose processor, such as Central Processing Unit (CPU), Network Processor (NP) and so on. It may also be Digital Signal Processing (DSP), Application Specific Integrated Circuit (ASIC), Field-programmable Gate Array (FPGA) or other programmable logic devices, discrete gate or transistor logic devices, discrete hardware components.

In an example of the present disclosure, when receiving a communication packet, the network device determines a target service matching the communication packet according to matching rules of services set in a packet processing policy. If a fast-forwarding table corresponding to the communication packet is not stored locally, a preset target priority of the target service is obtained, and a target resource utilization threshold corresponding to the target priority is determined according to a preset correspondence between priorities and resource utilization thresholds. Then, the network device determines whether a current resource utilization is greater than the target resource utilization threshold. If the current resource utilization is not greater than the target resource utilization threshold, the fast-forwarding table corresponding to the communication packet is established. In this way, when the current resource utilization is not greater than the target resource utilization threshold, the fast-forwarding table corresponding to the communication packet may be established. By applying the example of the present disclosure, it is possible to selectively establish fast-forwarding tables for communication packets of some data streams and it is unnecessary to establish a fast-forwarding table for a communication packet of each data stream, thereby reducing the memory pressure of the network device and avoiding the network device to hang or restart.

Corresponding to the above example of the method for establishing a fast-forwarding table, an example of the present disclosure further provides a machine readable storage medium which stores machine executable instructions. The machine executable instructions, when invoked and performed by the processor, cause the processor to perform operations of:

when a communication packet is received, determining, according to matching rules of services set in a packet processing policy, a target service matching the communication packet;

if a fast-forwarding table corresponding to the communication packet is not stored locally, obtaining a preset target priority of the target service, and determining a target resource utilization threshold corresponding to the target priority according to a preset correspondence between priorities and resource utilization thresholds;

determining whether a current resource utilization is greater than the target resource utilization threshold; and establishing the fast-forwarding table corresponding to the communication packet if the current resource utilization is not greater than the target resource utilization threshold.

The machine executable instructions may cause the processor to perform other examples of the method for establishing a fast-forwarding table, which will not be described again.

In an example of the present disclosure, when receiving a communication packet, the network device determines a target service matching the communication packet according to matching rules of services set in a packet processing policy. If a fast-forwarding table corresponding to the communication packet is not stored locally, a preset target priority of the target service is obtained, and a target resource utilization threshold corresponding to the target priority is determined according to a preset correspondence between priorities and resource utilization thresholds. Then, the network device determines whether a current resource utilization is greater than the target resource utilization threshold. If the current resource utilization is not greater than the target resource utilization threshold, the fast-forwarding table corresponding to the communication packet is established. In this way, when the current resource utilization is not greater than the target resource utilization threshold, the fast-forwarding table corresponding to the communication packet may be established. By applying the example of the present disclosure, it is possible to selectively establish fast-forwarding tables for communication packets of some data streams and it is unnecessary to establish a fast-forwarding table for a communication packet of each data stream, thereby reducing the memory pressure of the network device and avoiding the network device to hang or restart.

The aforementioned examples may be implemented in whole or in part by software, hardware, firmware, or any combination thereof. In the case that the examples are implemented by software, the examples may be implemented in whole or in part in the form of a computer program product. The computer program product includes one or more computer instructions. When the computer program instructions are loaded and executed on a computer, the processes or functions described according to the examples of the present invention are implemented in whole or in part. The computer may be a general-purpose computer, a dedicated computer, a computer network, or other programmable devices. The computer instructions may be stored in a computer-readable storage medium or may be transmitted from one computer-readable storage medium to another computer-readable storage medium, for example, the computer instructions may be transmitted from a web site, a computer, a server, or a data center to another web site, another computer, another server, or another data center via a cable (such as a coaxial cable, an optical fiber, a digital subscriber line (DSL)) or wireless (such as infrared, wireless, microwave, etc.). The computer-readable storage medium may be any available medium that may be accessed by a computer or a data storage device including a server or a data center integrated by one or more available media. The available media may be magnetic media (such as floppy disks, hard disks, magnetic tapes), optical media (such as DVDs), or semiconductor media (such as solid state disk (SSD)), and so on.

It should be noted that, the relationship terms herein such as "first", "second" and the like are only used to distinguish one entity or operation from another entity or operation, but do not necessarily require or imply that there is actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a . . . " or "include(s) a . . . " do not exclude that there are other identical elements in the processes, methods, articles, or devices which include these elements.

All of the examples in the description are described in a correlated manner, and identical or similar parts in various examples can refer to one another. In addition, the description for each example focuses on the differences from other examples. In particular, the example of the system is described briefly, since it is substantially similar to the example of the method, and the related contents can refer to the description of the example of the method.

The examples described above are merely preferred examples of the present application, and not intended to limit the scope of the present application. Any modifications, equivalents, improvements or the like within the spirit and principle of the application should be included in the scope of the application.

What is claimed is:

1. A method for establishing a fast-forwarding table, comprising:
when a communication packet is received, determining, according to matching rules of services set in a packet processing policy, a target service matching the communication packet;
responsive to determining that a fast-forwarding table corresponding to the communication packet is not stored locally, obtaining a preset target priority of the target service, and determining a target resource utilization threshold corresponding to the target priority according to a preset correspondence between priorities and resource utilization thresholds;
determining whether a current resource utilization is greater than the target resource utilization threshold; and
establishing a fast-forwarding table corresponding to the communication packet responsive to determining that the current resource utilization is not greater than the target resource utilization threshold.

2. The method of claim 1, comprising:
establishing a temporary forwarding table corresponding to the communication packet when the communication packet is received;
wherein establishing a fast-forwarding table corresponding to the communication packet comprises:
removing a temporary flag in the temporary forwarding table, and establishing an association between a session corresponding to the communication packet and the temporary forwarding table to obtain the fast-forwarding table corresponding to the communication packet.

3. The method of claim 2, comprising:
responsive to determining that the current resource utilization is greater than the target resource utilization threshold, removing the temporary forwarding table corresponding to the communication packet;
or responsive to determining that no service matching the communication packet is determined according to the packet processing policy, removing the temporary forwarding table corresponding to the communication packet.

4. The method of claim 1, wherein when a plurality of target services matching the communication packet are determined, establishing a fast-forwarding table corresponding to the communication packet responsive to determining that the current resource utilization is not greater than the target resource utilization threshold comprises:
responsive to determining that the current resource utilization is not greater than a maximum threshold in determined target resource utilization thresholds, establishing the fast-forwarding table corresponding to the communication packet.

5. The method of claim 1, comprising:
responsive to determining that the current resource utilization is greater than the target resource utilization threshold, determining, according to a preset association between fast-forwarding tables and services, one or more first services for each of fast-forwarding tables that have been currently established, and determining the highest priority in one or more priorities of the one or more first services for each of the fast-forwarding tables;
determining, from the determined highest priorities, a first priority which is lower than or equal to the target priority, and determining, from the fast-forwarding tables, a target fast-forwarding table wherein the highest priority in one or more priorities of one or more services associated with this target fast-forwarding table is the first priority, and removing this target fast-forwarding table.

6. The method of claim 1, wherein after obtaining the preset target priority of the target service, the method comprises:
responsive to determining that the target priority is the highest priority, establishing the fast-forwarding table corresponding to the communication packet;
responsive to determining that the target priority is the lowest priority, establishing no fast-forwarding table corresponding to the communication packet; and
responsive to determining that the target priority is a priority other than the highest priority and the lowest priority, determining the target resource utilization threshold corresponding to the target priority according to the preset correspondence between priorities and resource utilization thresholds.

7. The method of claim 2, wherein the packet processing policy comprises a matching order of services and matching rules of the services;
the method comprises:
responsive to determining that the current resource utilization is greater than the resource utilization threshold, determining whether the target service is the last service in the matching order; responsive to determining that the target service is not the last service in the matching order, determining a next target service matching the communication packet by matching the communication packet with a matching rule of an unmatched service in the services according to the matching order of the services; responsive to determining that the target service is the last service in the matching order, removing a temporary forwarding table corresponding to the communication packet;
responsive to determining that the current resource utilization is not greater than the target resource utilization threshold, determining whether the fast-forwarding table corresponding to the communication packet has been established; responsive to determining that the fast-forwarding table corresponding to the communication packet has not been established, establishing the fast-forwarding table corresponding to the communication packet.

8. A network device, comprising: a processor and a machine readable storage medium, wherein the machine readable storage medium stores machine executable instructions executed by the processor, and the machine executable instructions, when executed by the processor, cause the processor to perform operations of:
when a communication packet is received, determining, according to matching rules of services set in a packet processing policy, a target service matching the communication packet;
responsive to determining that a fast-forwarding table corresponding to the communication packet is not stored locally, obtaining a preset target priority of the target service, and determining a target resource utilization threshold corresponding to the target priority according to a preset correspondence between priorities and resource utilization thresholds;

determining whether a current resource utilization is greater than the target resource utilization threshold; and establishing a fast-forwarding table corresponding to the communication packet responsive to determining that the current resource utilization is not greater than the target resource utilization threshold.

9. The network device of claim 8, wherein the processor is caused by the machine executable instructions to perform operations of:

establishing a temporary forwarding table corresponding to the communication packet when the communication packet is received; and removing a temporary flag in the temporary forwarding table, and establishing an association between a session corresponding to the communication packet and the temporary forwarding table to obtain the fast-forwarding table corresponding to the communication packet.

10. The network device of claim 9, wherein the processor is caused by the machine executable instructions to perform operations of:

responsive to determining that the current resource utilization is greater than the target resource utilization threshold, removing the temporary forwarding table corresponding to the communication packet; or responsive to determining that no service matching the communication packet is determined according to the packet processing policy, removing the temporary forwarding table corresponding to the communication packet.

11. The network device of claim 8, wherein when a plurality of target services matching the communication packet are determined, responsive to determining that the current resource utilization is not greater than the target resource utilization threshold, the processor is caused by the machine executable instructions to perform an operation of:

responsive to determining that the current resource utilization is not greater than a maximum threshold in determined target resource utilization thresholds, establishing the fast-forwarding table corresponding to the communication packet.

12. The network device of claim 8, wherein the processor is caused by the machine executable instructions to perform operations of:

responsive to determining that the current resource utilization is greater than the target resource utilization threshold, determining, according to a preset association between fast-forwarding tables and services, one or more first services for each of fast-forwarding tables that have been currently established, and determining the highest priority in one or more priorities of the one or more first services for each of the fast-forwarding tables; and determining, from the determined highest priorities, a first priority which is lower than or equal to the target priority, and determining, from the fast-forwarding tables, a target fast-forwarding table wherein the highest priority in one or more priorities of one or more services associated with this target fast-forwarding table is the first priority, and removing this target fast-forwarding table.

13. The network device of claim 8, wherein after a preset target priority of the target service is obtained, the processor is caused by the machine executable instructions to perform operations of:

responsive to determining that the target priority is the highest priority, establishing the fast-forwarding table corresponding to the communication packet;

responsive to determining that the target priority is the lowest priority, establishing no fast-forwarding table corresponding to the communication packet; and responsive to determining that the target priority is a priority other than the highest priority and the lowest priority, determining the target resource utilization threshold corresponding to the target priority according to the preset correspondence between priorities and resource utilization thresholds.

14. The network device of claim 9, wherein the packet processing policy comprises a matching order of services and matching rules of the services;

the processor is caused by the machine executable instructions to perform operations of:

responsive to determining that the current resource utilization is greater than the resource utilization threshold, determining whether the target service is the last service in the matching order; responsive to determining that the target service is not the last service in the matching order, determining a next target service matching the communication packet by matching the communication packet with a matching rule of an unmatched service in the services according to the matching order of the services; and responsive to determining that the target service is the last service in the matching order, removing a temporary forwarding table corresponding to the communication packet; and responsive to determining that the current resource utilization is not greater than the target resource utilization threshold, determining whether the fast-forwarding table corresponding to the communication packet has been established; and responsive to determining that the fast-forwarding table corresponding to the communication packet has not been established, establishing the fast-forwarding table corresponding to the communication packet.

15. A non-transitory machine readable storage medium for storing machine executable instructions, wherein the machine executable instructions, when invoked and executed by the processor, cause the processor to perform operations of:

when a communication packet is received, determining, according to matching rules of services set in a packet processing policy, a target service matching the communication packet;

responsive to determining that a fast-forwarding table corresponding to the communication packet is not stored locally, obtaining a preset target priority of the target service, and determining a target resource utilization threshold corresponding to the target priority according to a preset correspondence between priorities and resource utilization thresholds;

determining whether a current resource utilization is greater than the target resource utilization threshold; and establishing the fast-forwarding table corresponding to the communication packet responsive to determining that the current resource utilization is not greater than the target resource utilization threshold.

16. The machine readable storage medium of claim 15, wherein the processor is caused by the machine executable instructions to perform operations of:

establishing a temporary forwarding table corresponding to the communication packet when the communication packet is received; and removing a temporary flag in the temporary forwarding table, and establishing an association between a session corresponding to the communication packet and the temporary forwarding table to obtain the fast-forwarding table corresponding to the communication packet.

17. The machine readable storage medium of claim 16, wherein the processor is caused by the machine executable instructions to perform operations of:

responsive to determining that the current resource utilization is greater than the target resource utilization threshold, removing the temporary forwarding table corresponding to the communication packet; or responsive to determining that no service matching the communication packet is determined according to the packet processing policy, removing the temporary forwarding table corresponding to the communication packet.

18. The machine readable storage medium of claim 15, wherein when a plurality of target services matching the communication packet are determined, responsive to determining that the current resource utilization is not greater than the target resource utilization threshold, the processor is caused by the machine executable instructions to perform an operation of:

responsive to determining that the current resource utilization is not greater than a maximum threshold in determined target resource utilization thresholds, establishing the fast-forwarding table corresponding to the communication packet.

19. The machine readable storage medium of claim 15, wherein the processor is caused by the machine executable instructions to perform operations of:

responsive to determining that the current resource utilization is greater than the target resource utilization threshold, determining, according to a preset association between fast-forwarding tables and services, one or more first services for each of fast-forwarding tables that have been currently established, and determining the highest priority in one or more priorities of the one or more first services for each of the fast-forwarding tables; and determining, from the determined highest priorities, a first priority which is lower than or equal to the target priority, and determining, from the fast-forwarding tables, a target fast-forwarding table wherein the highest priority in one or more priorities of one or more services associated with this target fast-forwarding table is the first priority, and removing this target fast-forwarding table.

20. The machine readable storage medium of claim 15, wherein after a preset target priority of the target service is obtained, the processor is caused by the machine executable instructions to perform operations of:

responsive to determining that the target priority is the highest priority, establishing the fast-forwarding table corresponding to the communication packet;

responsive to determining that the target priority is the lowest priority, establishing no fast-forwarding table corresponding to the communication packet; and responsive to determining that the target priority is a priority other than the highest priority and the lowest priority, determining the target resource utilization threshold corresponding to the target priority according to the preset correspondence between priorities and resource utilization thresholds.

\* \* \* \* \*